United States Patent [19]

Peterson et al.

[11] Patent Number: 4,625,473
[45] Date of Patent: Dec. 2, 1986

[54] ANTI-TWIST ROD SECTION AND METHOD OF USING THE SAME IN SURVEY MONUMENT PLACEMENT

[75] Inventors: Phillip R. Peterson; William C. Rushing, both of Madison, Wis.

[73] Assignee: Berntsen, Inc., Madison, Wis.

[21] Appl. No.: 704,328

[22] Filed: Feb. 22, 1985

[51] Int. Cl.⁴ .............................................. E02D 5/74
[52] U.S. Cl. ......................................... 52/98; 52/155; 52/103
[58] Field of Search ................................... 52/98–100, 52/155, 103; 411/387, 386

[56] References Cited

U.S. PATENT DOCUMENTS

| | | | |
|---|---|---|---|
| 1,214,679 | 10/1915 | Hindmarsh . | |
| 1,308,939 | 5/1914 | Eggleston . | |
| 1,902,875 | 3/1931 | Mason . | |
| 2,038,962 | 12/1935 | Schulthess | 52/155 |
| 3,279,133 | 10/1966 | De Korte | 52/103 |
| 3,481,572 | 12/1969 | Casebolt | 52/100 |
| 3,665,801 | 5/1972 | Gutshall | 411/387 |
| 3,748,795 | 7/1973 | Berntsen | 52/98 |
| 3,899,856 | 8/1975 | Johnson | 52/98 |
| 3,916,757 | 11/1975 | Wilson | 411/386 |
| 3,952,878 | 4/1976 | Gorham | 52/155 |
| 4,087,945 | 5/1978 | Berntsen et al. | 52/103 |
| 4,252,472 | 2/1981 | Moraly . | |
| 4,254,597 | 3/1981 | Felman et al. | 52/103 |
| 4,480,951 | 11/1984 | Regensburger | 411/387 |
| 4,502,258 | 3/1985 | Rushing | 52/155 |
| 4,533,278 | 8/1985 | Corsover | 52/98 |

FOREIGN PATENT DOCUMENTS 2306362  4/1976  France .................................. 411/387

OTHER PUBLICATIONS

Specification Sheet for Berntsen "Top Security" Rod Monument.

Primary Examiner—Henry E. Raduazo
Attorney, Agent, or Firm—Isaksen, Lathrop, Esch, Hart & Clark

[57]  ABSTRACT

An anti-twist rod section (10) is disclosed which adapts a survey monument (38) at once to resist rotation and to conveniently accept hardware designed to engage cylindrical rods. The method of using the anti-twist rod section (10) in placing a survey monument (38) is also disclosed. The anti-twist rod section includes an elongated body (12) which may have at least one surface channel (18). At least one fin (20) joined to the body (20) at a junction (22) preferably within the channel (18). The junction (22) is adapted to allow the anti-twist rod section (10) to be driven into the ground with the fins (20) in place such that a portion of the fin (20) resists rotation of the anti-twist section. The junction (22) is also adapted to allow the fins (20) to be severed from the body (12) as they are bent tangentially away from the body (12) such that the anti-twist rod section (10) is left unimpeded by fins. The body of the anti-twist rod section (10) may then accept hardware designed to engage cylindrical rods. The anti-twist rod section (10) is commonly employed as an upper section in a survey monument (38) where, after having been driven into the ground, it can resist tampering and can enhance the self-tightening of cylindrical rod sections (42) during driving of the rod series.

29 Claims, 11 Drawing Figures

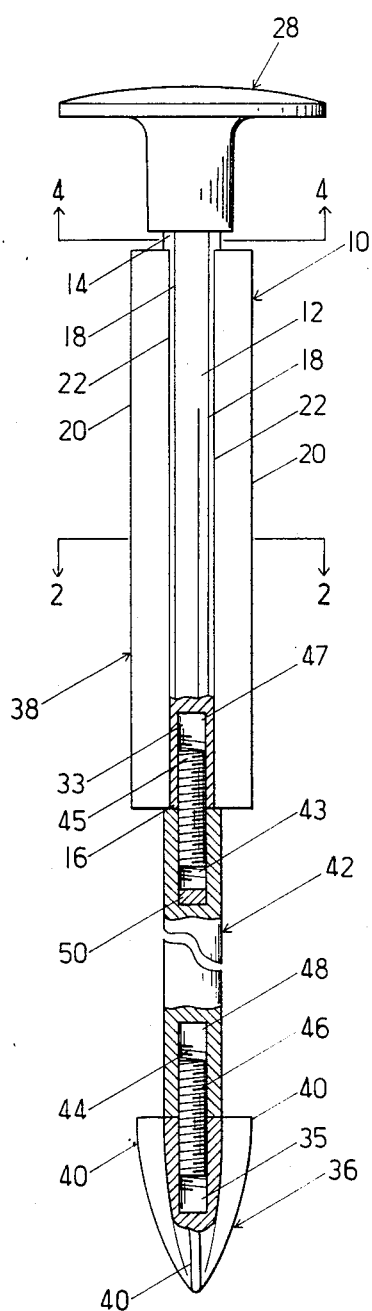
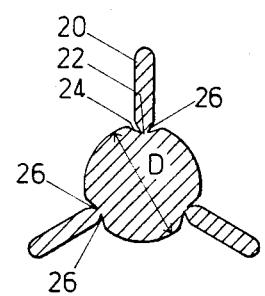
FIG. 2
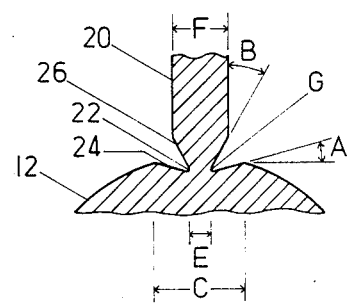
FIG. 3
FIG. 1

4,625,473

ANTI-TWIST ROD SECTION AND METHOD OF USING THE SAME IN SURVEY MONUMENT PLACEMENT

BACKGROUND OF THE INVENTION

This invention relates to finned rod sections adapted to be driven through the ground and particularly to the use of such a rod section in placing a driven-type survey monument.

Finned monument rods adapted to be driven through the ground are known. Such rods offer rotational and horizontal stability once in place and are thus particularly appropriate for use as survey monuments. Finned rods can also effectively dissipate heat through their extended fins thereby minimizing the depth affected by surface heating. This is particularly important for stabilizing monuments installed in permafrost. Finned rods, however, are generally more resistant to being driven than cylindrical rods and, of course, cannot be used where they must rotate during installation. Moreover, capping a finned rod at the ground surface can be inhibited by the fins.

Survey monuments which must be driven deep underground or to an indeterminate point of refusal commonly include several sections of rod which are joined as the monument is installed. A particularly useful monument is disclosed by U.S. Pat. No. 4,087,945 to Berntsen et al. The Berntsen et al. monument has cylindrical rods which are joined by threaded connectors incorporated within the cylindrical cross-section of the rods and a barbed penetrating point designed to rotate as it is driven such that the threaded connections are tightened during the driving process. Berntsen et al. also shows a marker cap designed to fit tightly over the monument after it has been fully driven.

Devices incorporating the self-tightening invention disclosed by Berntsen et al. are relatively easy to install. However, such monuments may be subject to tampering. In particular, the uppermost section may be uncoupled by grasping that section at the ground surface and rotating it until the threaded connection is parted. One solution to this problem is disclosed in copending application Ser. No. 534,414, now U.S. Pat. No. 4,502,258, which shows a finned section which may be incorporated into the upper portion of a monument. The fins on the finned section engage the earth to prevent rotation either during installation or upon attempted removal. The finned section also provides horizontal stability to the monument. Moreover, the finned section cooperates with a series of threadedly connected cylindrical rod sections beneath it by resisting the torque imposed on the cylindrical rod sections by a rotating point section and thus aids in tightening the connections between all the sections.

Standard marker caps designed for monuments of standard cross section, particularly cylindrical monuments, cannot be used on the finned sections unless the fins are first severed and the remaining rod is filed down to permit capping. This can prove cumbersome in the field, particularly where the process must be accomplished at or slightly below ground grade.

SUMMARY OF THE INVENTION

This invention comprises a unique finned anti-twist rod section capable of being driven into the ground with the fins in place but also capable of having its fins severed from its body so that the anti-twist rod section may be engaged by fixtures with standard sockets sized for the body cross section. Preferably, the anti-twist rod section has a generally cylindrical body of generally circular cross-section with at least one fin integrally formed therewith and extending radially therefrom. The fins join the body at the apex of a necked down portion of each fin, providing a line of weakness extending the length of the fin at the joint. Preferably, the body has a surface channel for each fin along its length from which the fin extends. The fin may be severed from the body by bending it tangentially away from the body to rupture the metal of the fin at the joint.

The invention is useful as a survey monument, particularly in combination with other elements such as a driving point, a marker cap and additional rod sections. In such an application, a rotation inducing penetrating point and cylindrical rod sections are driven into the ground in the manner described in U.S. Pat. No. 4,087,945. The finned rod section of the present invention is then connected to the rod series as the uppermost rod section. As the fins enter the ground, rotation of the rod series is opposed by the fins, thereby tightening the connections between the rods in the series. The joint between the fins and the rod body is sufficiently strong to resist longitudinal forces ordinarily experienced during driving of the rod section into the ground, as well as the circumferential forces imposed as the fins resist the torque transmitted from the penetrating point section. However, a user can exert enough force on the top of each fin with a hand tool, such as a pliers or adjustable wrench, to rupture the joint and pull a selected portion of the fin away from the body. In this manner, a sufficient portion of the top of the rod section can be cleared to allow a marker cap to be fitted tightly over the top end. Where the rod section is to be used with conventional marker caps having a socket adapted to tightly engage a standard cylindrical rod body, it is of particular advantage to utilize a rod body having channels therein at which the fins join the body. Any rough metal remaining on the rod at the ruptured joint will generally be within the channel and below the circumference of the rod body so that proper fitting of the marker cap to the rod body will not be interfered with.

The anti-twist rod section of the present invention thus provides all of the advantages of an anti-twist rod section with rigid, unbreakable fins, but is more easily used by a surveyor in the field since the selected portions of the fins can easily and quickly be displaced or removed without the time consuming cutting and filing previously required.

Further objects, features and advantages of the invention will be apparent from the following detailed description when taken in conjunction with the accompanying drawings.

BRIEF DESCRIPTION OF THE DRAWINGS

In the drawings:

FIG. 1 an elevational view of a survey monument employing an anti-twist rod section, the figure partially sectioned to show the threaded connections used in the preferred embodiment.

FIG. 2 is a sectional view of the anti-twist rod section taken along line 2—2 of FIG. 1.

FIG. 3 is a detail from FIG. 2 showing the junction of a fin to the body of the anti-twist rod section within a surface channel.

DESCRIPTION OF THE PREFERRED EMBODIMENT

Figure 4:
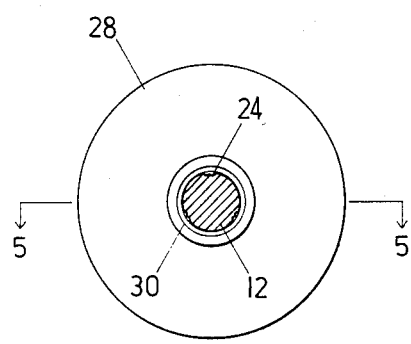
FIG. 4 is a sectional view taken along line 4—4 of FIG. 1 showing the anti-twist rod section after its fins have been partially severed and it has been fitted with a marker cap.
Figure 6:
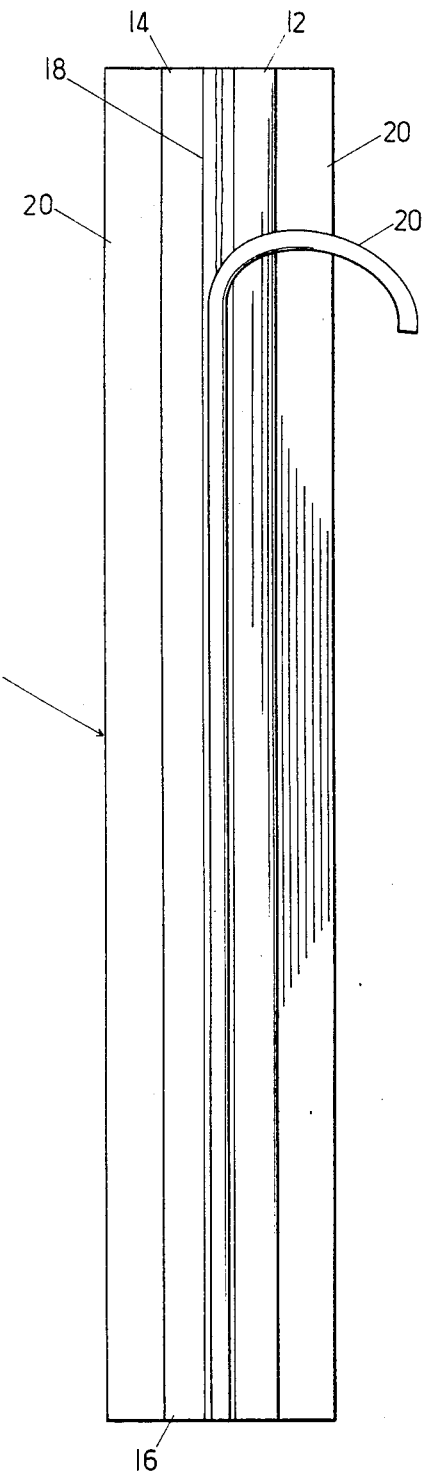
FIG. 6 is an elevational view of an anti-twist rod section with one fin partially severed near the top and displaced.

Referring now more particularly to the drawings, wherein like numerals refer to like parts throughout the several views, the anti-twist rod section is shown generally at 10 in FIGS. 1 and 6. The anti-twist rod section 10 has an elongated body 12 which in the preferred embodiment is substantially cylindrical. Bodies having other than circular cross sections may also be used as shown in FIGS. 8 through 11. The body 12 has upper and lower ends 14 and 16, respectively. The body 12 may have at least one and preferably three surface channels 18 which run parallel to the longitudinal axis of the body 12. At least one substantially straight fin 20 is joined to the body 12 at a junction 22 at the apex of a necked down portion of the fin to provide a line of weakness extending the length of the fin at the joint. In the preferred embodiment, the junction 22 lies in the surface channel 18. Each fin 20 is substantially rectangular in shape and extends outwardly from the channel 18 with the plane of the fin 20 running parallel to the longitudinal axis of the body 12. As shown in FIG. 6, both the surface channels 18 and the fins 20 preferably extend the entire length of the body. The circumference of the body 12, as best shown in FIGS. 2 and 4, is thus generally circular except for an indentation 24 attributable to each surface channel 18. The junction 22 of each fin 20 to the body 12 is adapted to allow the anti-twist rod section 10 to be driven into the ground with the fins 20 in place and to allow the fins 20 to be severed from the body 12 as they are bent tangentially away from the body 12. This is accomplished in the preferred embodiment by providing each fin 20 with grooves 26 along its junction 22 to the body 12 such that the fin may be severed along the line of weakness in the fin defined between the grooves 26.

Figure 10:
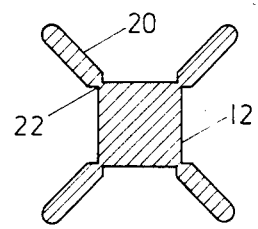
FIG. 10 is a sectional view of an alternative embodiment of an anti-twist rod section having a body with a rectangular cross section and with fins joined along the corners of the rectangle.
Figure 11:
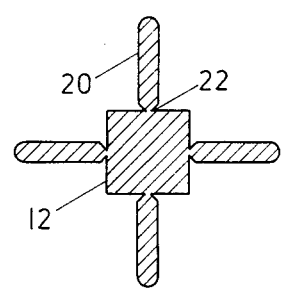
FIG. 11 is a sectional view of an alternative embodiment of an anti-twist rod section having a body with a rectangular cross section and with fins joined along the sides of the rectangle.

It will be noted that in the embodiment of the invention utilizing the channels 18, when all the fins 20 are severed from a portion of the anti-twist rod section 10 that portion is left with a circumference which is contained within a circle defined by the circular portion of the body circumference. This feature, best shown in Figs. 1 and 4, allows the top of the anti-twist rod section 10 to be equipped with hardware designed to engage standard cylindrical rods. In particular, survey marker caps such as that shown at 28 are frequently cast to tightly engage the top end of cylindrical rods. Severance of the fins 20 within the surface channels 18 allows use of such caps. As shown best in FIG. 5, the marker cap 28 may have a longitudinally fluted socket 30 adapted to fit tightly over the circular portion of the body circumference in the same manner it would fit over completely cylindrical rods. Placement of the cap 28 normally requires hammer blows or other suitable force. Naturally, anti-twist rod sections with other than circular cross sections can also be fitted with hardware designed to engage their bodies after the fins of this invention have been severed. Often, cylindrically socketed hardware will suffice even in those cases when the body extremeties such as the points of the triangles in FIGS. 8 and 9, and the corners of the rectangles in FIGS. 10 and 11, are appropriately designed to tightly engage a socket.

Figure 5:
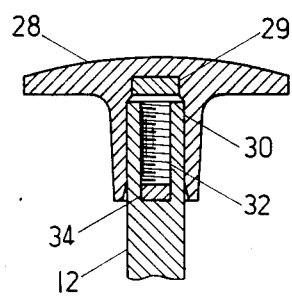
FIG. 5 is a sectional view of the anti-twist rod section after its fins have been partially severed taken along line 5—5 of FIG. 4 and showing engagement of the anti-twist rod section by a marker cap.

Even when equipped with a marker cap, the anti-twist rod section 10 may be difficult to locate after it is driven into the ground, particularly if the marker cap is dislodged. To facilitate relocation of the monument, a bore 32 can be formed in the upper end of the body 12 as shown in FIG. 5. A magnet 34 is then placed in the bore to facilitate magnetic location of the anti-twist rod section 10 after it is driven. The bore 32 with the magnet 34 enclosed is then preferably covered by a marker cap 28 as shown in FIG. 5. The marker cap 28 may also include a cap magnet 29.

The anti-twist rod section 10 may be buried or driven into the ground by itself to serve as a survey monument. In addition, the connection of an anti-twist rod section 10 to a penetrating point section 36 by using a threaded connector serves as the basis for a novel sectionalized driven-type survey monument. By employing the anti-twist rod section 10, the monument 38 is adapted to resist rotation after installation. The penetrating drive point section 36 used in the preferred embodiment of the survey monument 38 has at least two and preferably three generally longitudinal barbs 40 radially spaced on its periphery. In such a monument, the shoulders on the outwardly extending barbs 40 help to prevent the monument from being pulled out of the ground.

When the monument 38 must be driven to substantial depths, only one anti-twist rod section 10 need be used. In such applications, as shown in FIG. 1, the anti-twist rod section 10 is commonly used in combination with at least one cylindrical rod section 42 of uniform cross-section, each cylindrical rod section having longitudinal threaded bores 43 and 44 in its top and bottom ends respectively, and in combination with threaded connectors 45 and 46 that are turned into the threaded bores 33, 35, 43 and 44 such that the anti-twist rod section 10, the penetrating drive point section 36 and all cylindrical rod sections 42 are connected in series with the penetrating drive point section 36 at the lower end of the monument 38. The series of cylindrical rods 42 is of uniform cross-section throughout its length, and the cylindrical rods 42 are connected solely by threaded connectors such that the rotation of the penetrating drive point section 36 as it is driven into the ground tightens the connections between the cylindrical rod sections 42 and between the uppermost cylindrical rod section and the anti-twist rod section 10 to which it is connected.

To help in locating the monument after placement, the bores 43 and 44 in the upper and lower ends of the cylindrical rod sections 42 may be formed with portions 47 and 48 which the threaded connectors do not occupy, as shown in FIG. 1, and at least one rod magnet 50 may be placed in at least one of the portions to facilitate later magnetic location.

The anti-twist rod section 10 preferably has three surface channels 18 circumferentially spaced on the surface of the body 12 which extend the entire length of the body 12, each surface channel having a fin 20 joined to the body therein. The fins are preferably substantially rectangular in shape and extend the entire length of the body. However, as seen at the lower end of the right fin in FIG. 7, the lower end of the fins may be cut at an angle to facilitate driving, particularly where the ground is hard or covered with blacktop. As seen in FIGS. 2 and 3, the fins 20 of the preferred embodiment of the monument 38 have grooves 26 along their junctions 22 to the body 20 such that each fin 20 may be severed along its groove 26. As stated above, this allows the fins to be extruded integrally with the body while retaining their function. By using the anti-twist rod section 10 as the upper segment of the monument 38, the monument may be rotationally stabilized and still utilize a marker cap 28 having a longitudinally fluted socket 30 adapted to fit tightly over the circular portion of the body circumference.

Figure 7:
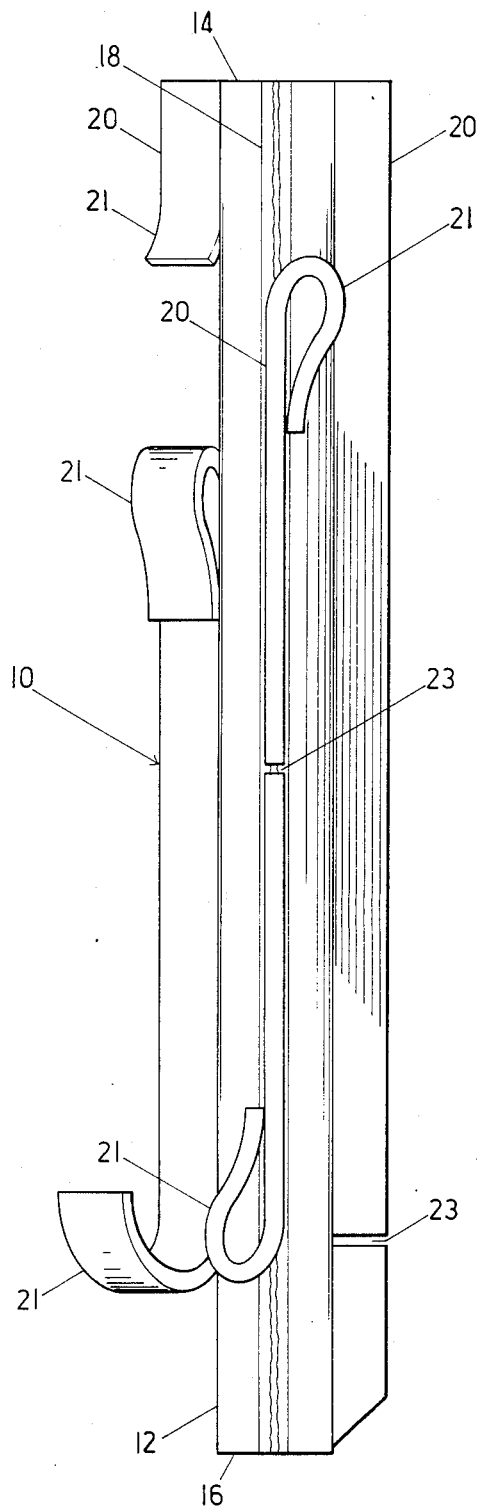
FIG. 7 is an elevational view of an anti-twist rod section with slotted fins showing the fins partially severed and displaced in various manners.
Figure 8:
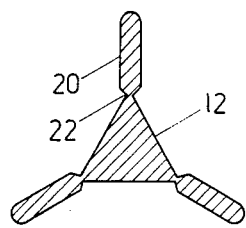
FIG. 8 is a sectional view through an alternative embodiment of an anti-twist rod section having a body with a triangular cross section and with fins joined along the points of the triangle.
Figure 9:
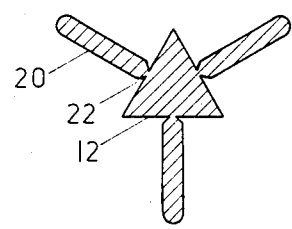
FIG. 9 is a sectional view through an alternative embodiment of an anti-twist rod section having a body with a triangular cross section and with fins joined along the sides of the triangle.

The anti-twist rod section 10 can be used to provide vertical as well as rotational stability. The method of providing vertical stability is disclosed below, but the anti-twist rod section 10 can be adapted for such use by providing at least one fin 20 with a displaced portion 21 which protrudes from the plane of the fin. After it is placed into the ground and the soil sets around it, the displaced portion 21 resists further vertical movement. As best shown in FIGS. 6 and 7 this displaced portion 21 can be located either at the top of the fin or the bottom of the fin. Moreover, at least one fin 20 can be provided with a slot 23 across the width of that fin from its outer edge to its junction 22. A displaced portion 21 can be conveniently bent, molded, or otherwise provided at the top edge or the bottom edge of the slot.

Preferably, the marker cap 28, the anti-twist rod section 10, the penetrating drive point section 36 and the cylindrical rod sections 42 are all formed of high grade aluminum or aluminum-magnesium alloys. Alloy 6063-T6 may suitably be used for the anti-twist rod section 10 and is composed of approximately 97–98% aluminum, 0.45–0.90% magnesium and 0.20–0.60% silicon with less than 1% other materials. This alloy typically has a yield strength of approximately 25,000 pounds per square inch (25 ksi) and an ultimate strength of approximately 30 ksi with an elongation of approximately 8–10% in two inches (Ref. Federal Spec. QQ-A-200/9). The threaded connectors 45 and 46 are preferably formed of a stainless steel alloy high in chromium and nickel in order to minimize galvanic action or electrolysis when the monument 38 is assembled and installed in the ground.

The following are exemplary dimensions for an antitwist rod section formed of the foregoing material, referring to the reference numerals and letters in FIGS. 2 and 3, with the fin 20 symmetrically positioned at the center of the surface channel 18 and extending radially therefrom: a diameter D of the circular portion of the body circumference of approximately 0.75 inches (in.); a surface channel width C of approximately 0.20 in.; a junction width E of approximately 0.05 in.; a fin width F of approximately 0.125 in.; an approximate distance from the center of the body 12 to the tip of the fin 20 of 0.906 in.; a maximum meeting radius G at the convergence of fin 20 to body 12 of approximately 0.01 in.; an indentation angle A of the surface channel 18 of approximately 15 degrees from a chord between the two ends of the surface channel 18; and a groove angle B of approximately 30 degrees from the plane of the fin 20. Of course, it will be apparent to those of skill in the art by following the teachings herein that different dimensions and other materials may be appropriately chosen to provide the desired fin strength while allowing selective severing of the fin from the rod body when so desired.

The method of placing the monument 38 is itself novel and results after installation in a tamper-resistant survey monument 38. The basic method includes the steps of driving an anti-twist rod section 10 part way into the ground such that a first portion of a fin 20 is buried, thereby enabling the monument to resist rotation; and severing a second portion of the fin 20 from the body 12 by bending the fin 20 tangentially from the body 12 to leave an anti-twist rod section 10 with a top portion free of fins 20. The steps may be performed in either order but the anti-twist rod section 10 is particularly adapted so that the fins 20 may be conveniently severed after driving. In any case, the top of the anti-twist rod section 10 is rendered capable of accepting hardware designed to engage cylindrical rods, in particular a survey marker cap 28 with a fluted socket 30. If the anti-twist rod section 10 has been driven to the desired depth and the portion remaining above the ground is larger than desired, one may use the additional step of cutting off the anti-twist rod section 10 extending above the ground before severing the second portion of the fin 20. The fin severing step is preferably accomplished either by grasping the top of the fin 20 and thereafter pulling the fin 20 downward and outward from its top as shown in FIG. 6 or by cutting a slot 23 across the width of the fin 20 from its outer edge to the junction 22, grasping the fin 20 between its top and the slot, and thereafter pulling until the portion of the fin 20 between the slot and the top breaks off the body 12. The results of this latter fin severing step are exemplified by the fins shown in FIG. 1. Because of the structure of the anti-twist rod section, the fins will not be affected by normally encountered forces as they are driven into the ground, for example, longitudinal forces from friction or circumferential forces imposed by the torque from the rotating point. However, the fins will readily break off when torque is applied to the top of each fin about a radial line by a hand tool such as a pliers or an adjustable wrench. Applying torque in this manner applies shear stresses to the joint between the fin and body to cause rupture of the joint which progresses downwardly from the top of the fin. The first method is particularly appropriate where the monument 38 has already been driven into the ground and cutting a slot at or below the grade of the ground is difficult. In addition, after pulling the fin 20 from its top without actually breaking it from the body 12, the bent and extended fin 20, as shown in FIG. 5, can itself be buried to provide additional stability to the monument 38. In any case, the resulting clearance of the top of the rod body allows the additional step of tightly fitting a marker cap 28 with a fluted socket 30 over the body 12 after the fins 20 have been severed therefrom.

An additional step of connecting a penetrating drive point section 36 to the anti-twist rod section 10 before driving it into the ground may be practiced. Moreover, one may employ the several steps of connecting a penetrating drive point section 36 designed to rotate as it is driven into the ground to a cylindrical rod section 42 by using a threaded connector 46; thereafter driving the penetrating drive point section 36 and the cylindrical rod section 42 into the ground, thereby tightening the connection; and connecting the top of the uppermost cylindrical rod section 42 to the anti-twist rod section 10 before driving the anti-twist rod section 10 into the ground. The preferred method used for deep placement of the monument 38 includes the further steps of connecting at least one additional cylindrical rod section 42 in series between the lowest cylindrical rod section 42, to which the penetrating drive point 36 is connected, and the anti-twist rod section 10 by using threaded connectors such as those shown at 45 and 46, and driving each cylindrical rod section 42 into the ground, thereby tightening the connections of the cylindrical rod sections 42 as the penetrating drive point section 36 rotates. The anti-twist rod section 10 cooperates with the series of cylindrical rod sections 42 beneath it to resist the torque imposed by the penetrating drive point section 36 and thereby to enhance the tightening process.

To facilitate locating the monument 38 after installation, one may insert a magnet 34 into a bore 32 in the anti-twist rod section section 10.

Another method of placement includes the steps of severing a first portion of a fin 20 from the body 12 of an anti-twist rod section 10 while leaving a second portion of the fin 20 joined to the body 12; bending the first portion of the fin 20 to provide a displaced portion 21 which protrudes from the plane of the fin; and inserting the anti-twist rod section 10 into the ground to the extent that the displaced portion 21 is buried, thereby positioning the anti-twist rod section to resist removal. The step of severing a first portion may include either severing the top of the fin 20 or severing the bottom of the fin 20. Preferably, if the top of the fin 20 is severed in this method, the step of bending comprises bending the top of the fin downward until it substantially meets the plane of the fin as shown in the center fin in FIG. 7. Similarly, where the bottom of the fin 20 is severed, the step of bending can comprise bending the bottom of the fin upward until it substantially meets with the plane of the fin. While the fin is generally severed as it is bent, additional bending may be accomplished after severing is complete and even during the inserting step where the anti-twist rod section is being driven into the ground. The severing steps may be preceded by cutting a slot 23 across the width of the fin 20 from its outer edge to the junction 22. In such a case, the severing of a first portion of a fin may include either severing the portion of the fin immediately above the slot 23 or severing the portion of the fin immediately below the slot. Severing both above and below the slot is shown in the upper portion of the left fin in FIG. 7.

It is understood that the invention is not confined to the particular construction, arrangement of parts, steps or materials herein illustrated and described but embraces all such modified forms thereof as come within the scope of the following claims.

What is claimed is:

1. An anti-twist rod section adapted to be driven into the ground without rotation comprising:
    (a) an elongated body with upper and lower ends; and
    (b) at least one substantially straight fin joined to the body at a junction at the apex of a necked down portion of each fin to provide a line of weakness extending the length of the fin at the junction, the plane of each fin running parallel to the longitudinal body axis, and the junction of each fin to the body adapted to allow the anti-twist rod section to be driven into the ground with the fin in place and to allow the fin to be severed from the body at the junction as it is bent tangentailly away from the body, the dimensions of the junction and of the fin and the material of the fin selected such that the fin will bend when torque is applied to the fin to bend it tangentially away from the body and cause a rupture of the junction of the fin and body which progresses downwardly from the top of the fin as the fin is bent.

2. The anti-twist rod section of claim 1 wherein there are three fins on the body which are substantially rectangular in shape and extend the entire lenqth of the body.

3. The anti-twist rod section of claim 1 wherein each fin has grooves along its junction to the body defining the necked down portion of the fin such that the fin may be severed along the grooves.

4. The anti-twist rod section of claim 1 wherein the body and fins are formed of aluminum-magnesium alloy.

5. The anti-twist rod section of claim 1 wherein each fin is extruded integrally with the body portion of the anti-twist rod.

6. An anti-twist rod section adapted to be driven into the ground without rotation comprising:
    (a) an elongated substantially cylindrical body with upper and lower ends and with at least one surface channel parallel to the longitudinal body axis such that the circumference of the body is generally circular except for an indentation attributable to each surface channel; and
    (b) at least one substantially straight fin joined to the body at a junction within a channel at the apex of a necked down portion of the fin to provide a line of weakness extending the length of the fin at the junction, the fin extending outwardly from the channel, the plane of each fin running parallel to the longitudinal body axis, and the junction of each fin to the body adapted to allow the anti-twist rod section to be driven into the ground with the fin in place and to allow the fin to be severed from the body as it is bent tangentially away from the body to leave the portion of the anti-twist rod section from which the fin has been severed with a circumference which is contained within a circle defined by the circular portion of the body circumference.

7. The anti-twist rod section of claim 6 wherein there are three surface channels circumferentially spaced on the surface of the body which extend the entire length of the body and wherein each surface channel has a fin extending therefrom.

8. The anti-twist rod section of claim 6 wherein the fins are substantially rectangular in shape and extend the entire length of the body.

9. The anti-twist rod section of claim 6 wherein each fin has grooves along its junction to the body defining a necked down portion of the fin such that the fin may be severed along the grooves.

10. The anti-twist rod section of claim 6 wherein the body and fins are formed of aluminum-magnesium alloy.

11. The anti-twist rod section of claim 6 wherein each fin is extruded integrally with the body portion of the anti-twist rod.

12. The anti-twist rod section of claim 6 wherein the upper end of the body has a bore formed therein; and further comprising a magnet placed in the bore to facilitate magnetic location of the anti-twist rod section after it is driven.

13. The anti-twist rod section of claim 6 wherein at least one fin has a slot across the width of that fin from its outer edge to its junction.

14. A sectionalized driven-type survey monument adapted to resist rotation after installation, comprising:
 (a) a rotation-resistant anti-twist rod section having an elongated substantially cylindrical body with upper and lower ends, with a longitudinal threaded bore in its lower end and with at least one surface channel parallel to the longitudinal body axis such that the circumference of the body is generally circular except for an indentation attributable to each channel, and having at least one substantially straight fin joined to the body at a junction within the channel at the apex of a necked down portion of the fin to provide a line of weakness extending the length of the fin at the junction, the fin extending outwardly from the channel, the plane of each fin running parallel to the body axis, and the junction of each fin to the body adapted to allow the monument to be driven into the ground with the fin in place and to allow the fin to be severed from the body as it is bent tangentially away from the body to leave the portion of the anti-twist rod section from which the fin has been severed with a circumference which is contained within a circle defined by the circular portion of the body circumference;
 (b) a threaded connector seated partially into the threaded bore of the anti-twist rod section body and extending out therefrom; and
 (c) a penetrating drive point section having an upper end with a threaded bore which engages the threaded connector at the lower end of the monument and having at least two generally longitudinal barbs radially spaced on the periphery of the penetrating drive point section, each of the barbs having a biased turning surface which cause rotation of the penetrating point section as it is driven into the ground such that the connection of the penetrating drive point section is tightened.

15. A sectionalized driven-type survey monument adapted to resist rotation after installation, comprising:
 (a) a rotation-resistant anti-twist rod section having an elongated substantially cylindrical body with upper and lower ends, with a longitudinal threaded bore in its lower end and with at least one surface channel parallel to the longitudinal body axis such that the circumference of the body is generally circular except for an indentation attributable to each channel, and having at least one substantially straight fin joined to the body at a junction within a channel at the apex of a necked down portion of the fin to provide a line of weakenss extending the length of the fin at the junction, the fin extending outwardly from the channel, the plane of each fin running parallel to the body axis, and the junction of each fin to the body being adapted to allow the monument to be driven into the ground with the fin in place and to allow the fin to be severed from the body as it is bent tangentailly away from the body to leave the portion of the anti-twist rod section from which the fin has been severed with a circumference which is contained within a circle defined by the circular portion of the body circumference;
 (b) at least one cylindrical rod section of uniform cross-section, each cylindrical rod section having longitudinal threaded bores in its top and bottom ends;
 (c) a penetrating drive point section having an upper end with a threaded bore;
 (d) threaded connectors that are turned into the threaded bores such that the anti-twist rod section, the penetrating drive point section and all cylindrical rod sections are connected in series with the penetrating drive point section at the lower end of the monument; and
 (e) at least two generally longitudinal barbs radially spaced on the periphery of the penetrating drive point section, each of the barbs having a biased turning surface which cause rotation of the penetrating drive point section as it is driven into the ground such that the connections of the penetrating drive point section and rod sections are tightened.

16. The monument of claim 15 wherein all cylindrical rod sections are connected in series between the penetrating drive point section and an anti-twist rod section; wherein the series of cylindrical rods is of uniform cross-section throughout its length; and wherein the cylindrical rods are connected solely by threaded connectors such that the rotation of the penetrating drive point section as it is driven into the ground tightens the connections between the cylindrical rod sections and between the uppermost cylindrical rod section and the anti-twist rod section to which it is connected.

17. The monument of claim 16 wherein the bores formed in the upper and lower ends of the cylindrical rod sections have portions into which the threaded connectors are not turned; and further comprising at least one rod magnet placed in at least one of said portions to facilitate magnetic location of the monument after it is driven.

18. The monument of claim 15 wherein the penetrating drive point section, each cylindrical rod section and each anti-twist rod section are formed of an aluminum-magnesium alloy.

19. The monument of claim 15 further comprising an aluminum marker cap having a longitudinally fluted socket adapted to fit tightly over the circular portion of the body circumference.

20. The monument of claim 15 wherein there are three surface channels circumferentially spaced on the surface of the body which extend the entire length of the body; wherein each surface channel has a fin extending therefrom; and wherein the fins are substantially rectangular in shape and extend the entire length of the body.

21. The monument of claim 15 wherein each fin has grooves along its junction to the body defining a necked down portion of the fin such that the fin may be severed along the grooves.

22. The monument of claim 21, wherein each fin is extruded integrally with the body.

23. A sectionalized driven-type survey monument adapted to resist rotation after installation, comprising:
(a) a rotation-resistant anti-twist rod section having an elongated body with upper and lower ends, with a longitudinal threaded bore in its lower end, and having at least one substantially straight fin joined to the body at a junction at the apex of a necked down portion of each fin to provide a line of weakness extending the length of the fin at the junction, the plane of each fin running parallel to the body axis, and the junction of each fin to the body fin being adapted to allow the monument to be driven into the ground with the fin in place and to allow the fin to be severed from the body at the junction as it is bent tangentially away from the body, the dimensions of the junction and of the fin and the material of the fin selected such that the fin will bend when torque is applied to the fin to bend it tangentially away from the body and cause a rupture of the junction of the fin and body which progresses downwardly from the top of the fin as the fin is bent;
(b) at least one cylindrical rod section of uniform cross-section, each cylindrical rod section having longitudinal threaded bores in its top and bottom ends;
(c) a penetrating drive point section having an upper end with a threaded bore;
(d) threaded connectors that are turned into the threaded bores such that the anti-twist rod section, the penetrating drive point section and all cylindrical rod sections are connected in series with the pentrating drive point section at the lower end of the momument; and
(e) at least two generally longitudinal barbs radially spaced on the periphery of the penetrating drive point section, each of the barbs having a biased turning surface, which cause rotation of the penetrating drive point section as it is driven into the gorund such that the connection of the penetrating drive point section is tightened.

24. The monument of claim 23 wherein all cylindrical rod sections are connected in series between the penetrating drive point section and an anti-twist rod section; wherein the series of cylindrical rods is of uniform cross-section throughout its length; and wherein the cylindrical rods are connected solely by threaded connectors such that the rotation of the penetrating drive point section as it is driven into the ground tightens the connections between the cylindrical rod sections and between the uppermost cylindrical rod section and the anti-twist rod section to which it is connected.

25. The monument of claim 23 wherein the penetrating drive point section, each cylindrical rod section and each anti-twist rod section are formed of an aluminum-magnesium alloy.

26. The monument of claim 23 wherein the bores formed in the upper and lower ends of the cylindrical rod sections have portions into which the threaded connectors are not turned; and further comprising at least one rod magnet placed in at least one of said portions to facilitate magnetic location of the monument after it is driven.

27. The monument of claim 23 further comprising an aluminum marker cap having a longitudinally fluted socket adapted to fit tightly over the circular portion of the body circumference.

28. The monument of claim 23 wherein such fin has grooves along its junction to the body defining the necked down portion of the fin such that the fin may be severed along the grooves.

29. The monument of claim 28, wherein each fin is extruded integrally with the body.

* * * * *